United States Patent [19]
Trotta

[11] 3,808,484
[45] Apr. 30, 1974

[54] CONTROL UNIT FOR SELECTIVELY CONTROLLING DIRECTION OF CURRENT

[76] Inventor: Michael Trotta, 2954 W. 8th St., Brooklyn, N.Y. 11224

[22] Filed: Mar. 13, 1973

[21] Appl. No.: 340,914

[52] U.S. Cl................. 318/467, 318/282, 318/293
[51] Int. Cl. .......................................... G05b 11/14
[58] Field of Search.................... 318/293, 282, 467

[56] References Cited
UNITED STATES PATENTS

| | | | |
|---|---|---|---|
| 3,614,574 | 10/1971 | Hodges | 318/467 |
| 1,016,059 | 1/1912 | Barnum | 318/282 |
| 1,633,825 | 6/1927 | Prescott | 318/282 X |
| 2,311,168 | 2/1943 | Gendriess | 318/467 X |
| 2,836,991 | 6/1958 | Perlis | 318/282 |

Primary Examiner—B. Dobeck
Attorney, Agent, or Firm—Pennie & Edmonds

[57] ABSTRACT

A control unit for directing flow of current through one of two leads extending from the unit where the unit has a plurality of normally closed switches extending in a line with means for individually opening the switches and where one switch in the line is always open. Each switch has a moveable blade adapted to be connected to a source of electricity and which may contact spaced conductors included in a line with the space between adjacent conductors being spanned by a blade when a switch is in the closed position. A circuit is completed between the source and a lead connected to an end conductor in the line by way of the closed switches and conductors.

7 Claims, 3 Drawing Figures

PATENTED APR 30 1974 3,808,484

CONTROL UNIT FOR SELECTIVELY CONTROLLING DIRECTION OF CURRENT

FIELD OF THE DISCLOSURE

In many devices, such as in reversible electric motors, it is desirable to have a control unit which may selectively direct current to the motor and which will stop the motor at an exact predetermined position. For example in many machining operations, it is desirable that a work piece be rotated and accurately positioned circumferentially in order to be finished by a tool. A particular application utilizing a reversible motor in which accurate and precise rotation of the motor is required is disclosed in my co-pending application Ser. No. 287,108 relating to a Numerical Memory Device in which it is a requirement that circular index cards be quickly and accurately rotated to a predetermined position in order to take a reading from a card.

GENERAL SUMMARY OF THE INVENTION

Broadly, I provide a control unit which may selectively direct flow of current through one of two leads extending from the unit. The unit comprises a plurality of normally closed switches extending in a line wherein each of the switches has a moveable blade adapted to be connected to a source of electricity. A conductor is associated with each switch and is adapted to be contacted by a blade when the switch is in the closed position. Means are provided for operatively and selectively moving the blade of each switch in order to open the same and to disengage the blade from the conductor and which will always leave one switch in the line open. A number of conductors are spaced along a line so that one conductor is positioned between the blades of adjacent switches and such that a single blade may span the space between adjacent conductors when the switch with which it is associated is in the closed position. An end conductor is positioned at each end of the line of the conductors and has attached thereto a lead.

When a blade of a particular switch is connected to a source to energize that switch, a circuit will then be completed from the source through the blade of the energized switch, the conductors engaged by the closed switches in the line on one side of the energized switch and on to the lead connected to one of the end conductors. The circuit will not be completed to the end conductor on the side of the energized switch having the opened switch since the opened switch will not span the gap between adjacent conductors.

Preferably, the means for opening and closing the switches comprises a rotatable cam shaft having thereon a cam rise for each of the switches with the cams being so spaced circumferentially that one switch will always be open. In such event when the cam shaft is rotated, current will continue to flow through the energized switch until such time as the cam rise associated with that switch engages the moveable blade to break the contact between that blade and conductors.

In one form of the invention the rotatable cam shaft is rotated by a reversible motor which in turn is operatively connected to the leads extending from the end conductors. In this instance the cam shaft will continue to rotate until the energized switch is opened by its cam rise thus breaking the circuit to the motor and stopping the same.

A further form of the invention includes the use of a fixed blade connected to a further lead where the fixed blade is adapted to be contacted by the moveable blade of a switch when the switch is opened. In this instance the further lead may be connected to other apparatus such that the control switch may perform additional operations, as for example, the further lead may be connected to a brake relay which will apply a positive braking force to the motor rotating the cam shaft.

DETAILED DESCRIPTION OF THE PREFERRED EMBODIMENTS

Figure 1:
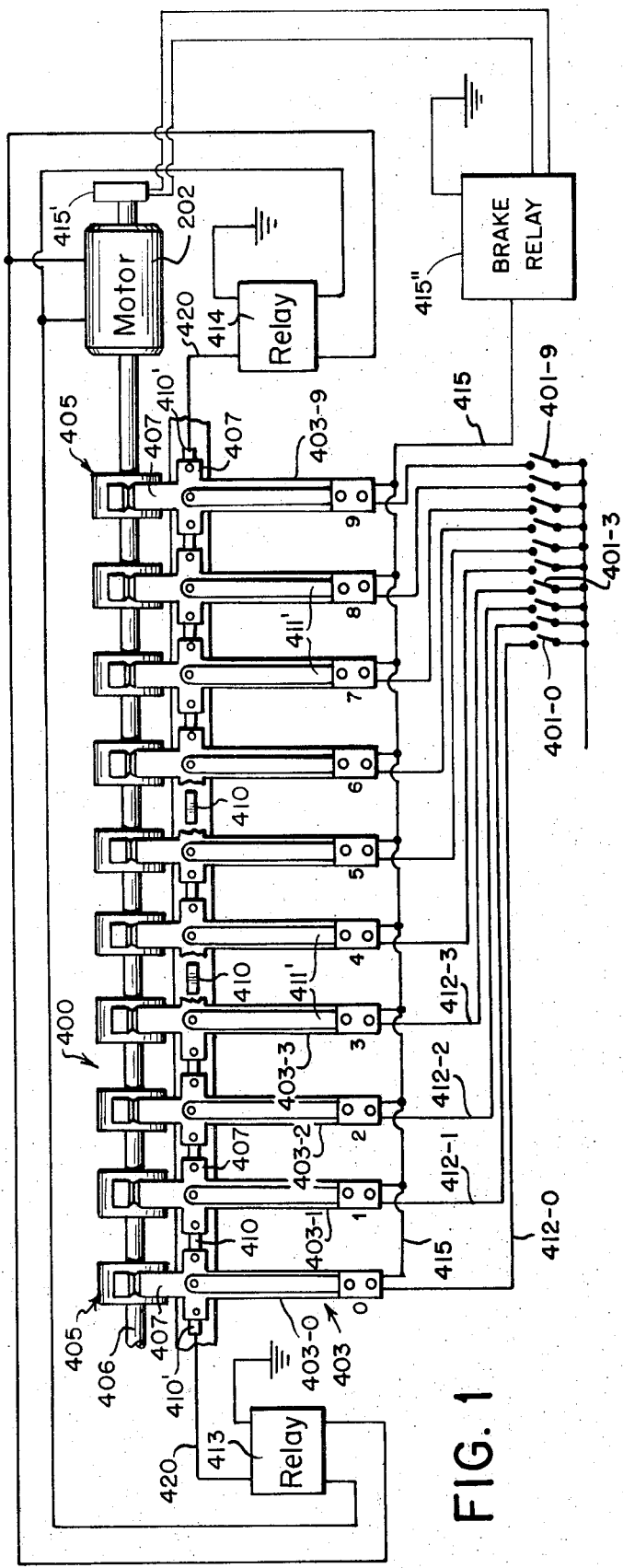
FIG. 1 is a diagrammatical plan view of a control unit constructed according to the invention utilized to provide accurate control of a reversible motor.
Figure 3:
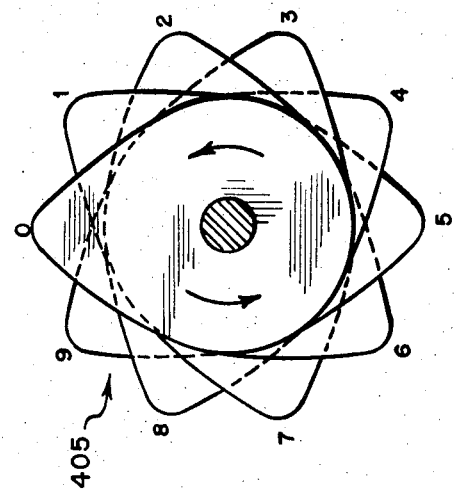
FIG. 3 is an enlarged end view of a portion of FIG. 1 illustrating the circumferential positioning of cam rises on the cam shaft.
Figure 2:
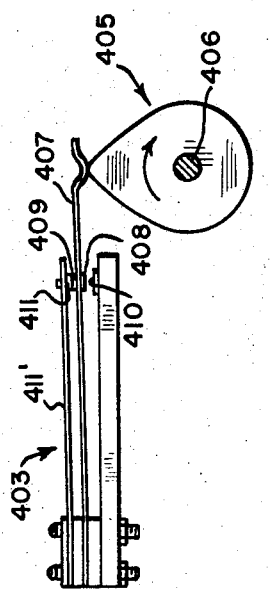
FIG. 2 is a side view of a portion of the control unit of FIG. 1 illustrating a single switch of the unit.

Referring to FIG. 1, there is disclosed a control unit 400 having thereon a plurality of selector switches 401-0 to 401-9 which connect leads 412-0 to 412-9 to a source of electricity, not shown, so as to individually energize any one of a plurality of switches 403. In the embodiment shown, ten normally closed switches 403-0 to 403-9 are illustrated and are arranged in a line. Each of the switches 403 is operated by a cam rise 405 mounted on a cam shaft 406. The cams, of which there are ten, are evenly distributed around the cam shaft as shown in FIG. 3 such that the rise of one of the cams will always be in a position to keep one of the ten switches open as seen in FIG. 2.

Each switch 403 has a moveable blade 407 which contacts the shaft and is moved by a cam rise. Contacts 408 and 409 are provided on the moveable blade. When the blade is in the down position, i.e. when not contacted by a cam rise, contact 408 will engage conductor 410 to close the switch. When the blade is in the raised or open position as shown in FIG. 2, contact 409 will engage contact 411 carried by a fixed blade 411'. The conductors 410 are spaced in a line so that one conductor is between the moveable blades of adjacent switches. The space or gap between adjacent conductors is adapted to be spanned by the cross T portion of the moveable blade. End conductors 410' are provided at each end of the line of conductors and each has thereon a lead 420. Leads 420 extend into relays 413 and 414 which in turn are operatively connected to a reversible electric motor 202.

The fixed blades 411' of all of the switches are connected by a common further lead 415 which may extend to a further device to be operated, for example, a brake relay used to actuate a brake for applying a braking force to the motor 202. This common lead will only be energized when the particular switch which is energized is in the open position.

The operation of the device is as follows. If the motor 202 is to be rotated to a particular circumferential position, the position is determined by one of the selector switches 401 which is then closed, for example switch 401-3. The lead 412-3 is then energized which will in turn energize the moveable blade of switch 403-3. If the cam shaft is in a position wherein the cam rise associated with the energized switch 403-3 is in the down position, the moveable blade of the switch will likewise be in the down position such that its contacts 408 will engage conductors 410 on either side of the switch. Since all of the switches 403 are closed with the exception of one, current may flow through all of the closed switches and conductors to an end conductor 410′ on one side of switch 403-3, to a lead 420 and on to a relay for operating the motor. Current however will not flow through the line of switches and conductors on the side of the energized switch 403-3 which has the open switch as there will be no way for the current to span the spacing between the adjacent conductors for that open switch. Current will continue to flow to the motor to cause it to rotate the cam shaft until the particular cam rise associated with the energized switch, in this instance 403-3, rises to move the blade 407 so that the contact between 407 and 410 is broken at which time the motor circuit will be broken.

The flexible blade 407 will be raised so that the contact between the moveable blade and the fixed blade 411 is made which then completes a circuit through the fixed blade 411′ and common lead 415 onto a further point of use, in this instance a brake relay 415″ which when energized activates a brake 415′ to lock the motor 202 and cam shaft from rotation. It is thus seen that the device provides a means for controlling rotation of the motor which may be connected to a work piece or other object desired to be rotated whereby the direction of current flow from the unit and degree of rotation is effectuated by use of the selector switches 401.

The unit 400 may be connected in series with further units to provide a greater degree of control of rotation of the motor. In such instance, the common lead 415 extending from the unit 400 would serve as a source of electricity to a further unit which would be similar to unit 400 and where the second unit would have additional selector switches similar to switches 401. In such event, ratio changing means would be required to vary the rotation of the cam shaft of the second unit with respect to the cam shaft of the first unit such that the amount of rotation of the second cam shaft would be a predetermined fraction of the rotation of the first cam shaft, i.e. one-tenth when each unit has 10 switches. In this manner the predetermined positioning of the rotation of the motor can be further controlled. Thus if the cam shaft of the first unit had 10 rises, each rise would preposition the motor with 36° of rotation. If a further control unit were utilized similar to the first, then each cam shaft of the second unit would further control rotation of the shaft and motor within 3.6° of rotation. The rotation of the motor could be further refined by additional units. In such event, the common lead from the last unit would lead to a brake relay, and if desired, the last unit could supply power to the motor at a reduced voltage to slow down its speed of rotation so as to insure that there would be no over-running of the motor beyond the desired degree of rotation.

I claim:

1. A control unit for selectively controlling the direction of current flow from said unit comprising:
    A. a rotatable cam shaft;
    B. means for rotating said shaft;
    C. a plurality of cam rises longitudinally positioned on said shaft and circumferentially evenly spaced thereon;
    D. a line of normally closed switches each adapted to be opened by a single one of said cam rises and wherein one switch of said line is always opened by a cam rise, each said switch having:
        i. a moveable blade adapted to be connected to a source of electricity and adapted to be moved by a cam rise to open the switch; and
        ii. a fixed conductor adapted to be engaged by the moveable blade when the blade is not engaged by a cam rise and the switch is closed and also to be engaged by the flexible blade of an adjacent switch in the line when said adjacent switch is closed;
    E. and an end conductor at each end of the line of switches connected to a lead and adapted to be engaged by a moveable blade of a switch at the end of the line;

whereby when the moveable blade of a particular switch of the line of switches is connected to a source, a circuit is completed from the source through at least one conductor to the lead at the end of the line of switches which is on the side of the blade connected to the source opposite the opened switch and whereby the circuit is maintained until the cam shaft rotates a cam rise to move the blade connected to the source to break the contact between the blade and conductor.

2. A control switch unit according to claim 1 wherein each said switch has a fixed blade connected to a further lead where the fixed blade is adapted to be contacted by said moveable blade when said moveable blade is engaged by a cam rise to complete a circuit between said source and said further lead.

3. A control switch unit according to claim 1 having in addition a reversible motor operatively connected to the leads connected to the end conductor whereby direction of rotation of the motor is dependent on the particular lead that is connected to the source.

4. A control switch unit according to claim 3 wherein said motor comprises said means for rotating said cam shaft.

5. A control unit for selectively controlling rotation of a reversible motor comprising:
    A. a rotatable cam shaft driven by said motor;
    B. a plurality of cam rises longitudinally positioned on said shaft and circumferentially evenly spaced thereon;
    C. a plurality of normally closed switches extending in a line parallel to said shaft with each said switch adapted to be opened by a cam rise and wherein one of said switches in said line is always open by a cam rise, each said switch having:
        i. a moveable blade adapted to be connected to a source of electricity and to be moved by a cam rise to open said switch; and
        ii. a fixed conductor adapted to be engaged by said moveable blade when said blade is not engaged by a cam rise and said switch is closed;
    D. the conductors of said switches being positioned in a line with a single conductor between adjacent moveable blades and an end conductor at each end of the line of conductors operatively connected to said motor;

whereby when a moveable blade of a single switch is connected to a source, a circuit is completed from the source through at least one conductor on the side of the blade connected to the source opposite said open switch whereby the motor will be energized to rotate the cam shaft until a cam rise engages the blade connected to the source to open the switch thus breaking the circuit to the motor.

6. A control unit according to claim 5 wherein each switch has a fixed blade connected to a further lead and wherein the fixed blade is adapted to be contacted by said moveable blade when the switch is open.

7. A control unit according to claim 6 wherein said further lead is operatively connected to a brake for stopping said motor.

* * * * *